United States Patent [19]
Richards

[11] Patent Number: 5,836,843
[45] Date of Patent: Nov. 17, 1998

[54] BRACE FOR OUTER ENDS OF VARIABLE PULLEY DRIVE

[75] Inventor: Dennis P. Richards, Lancaster, N.Y.

[73] Assignee: Richards Racing Products, Inc., Buffalo, N.Y.

[21] Appl. No.: 744,731

[22] Filed: Oct. 29, 1996

[51] Int. Cl.⁶ .................................. F16H 9/18; F16H 7/24
[52] U.S. Cl. ......................... 474/29; 474/150; 474/273
[58] Field of Search .................................. 474/8, 29, 30, 474/31, 37, 39, 41, 148, 150, 273

[56] References Cited

U.S. PATENT DOCUMENTS

| | | | |
|---|---|---|---|
| 3,916,705 | 11/1975 | Smith et al. | 474/31 |
| 3,985,192 | 10/1976 | Samuelson et al. | 180/5 R |
| 3,999,444 | 12/1976 | Willman | 474/29 |
| 4,023,635 | 5/1977 | Teal | 180/5 R |
| 4,046,023 | 9/1977 | Henle et al. | 474/31 |
| 4,069,882 | 1/1978 | Leonard et al. | 180/5 R |
| 4,237,997 | 12/1980 | Swanson | 180/272 |
| 4,304,150 | 12/1981 | Lupo et al. | 74/677 |
| 4,510,822 | 4/1985 | Yamamuro et al. | 74/733 |
| 4,767,386 | 8/1988 | Spaggiari | 474/148 |
| 4,781,656 | 11/1988 | Brachett et al. | 474/39 |
| 5,440,944 | 8/1995 | Chen | 474/148 |

OTHER PUBLICATIONS

Mod–Stock Competition—Performance Buyer's Guide—(Cover, Publisher Page and p. 51) Published Aug. 1996.

*Primary Examiner*—Charles A. Marmor
*Assistant Examiner*—Matthew A. Kaness
*Attorney, Agent, or Firm*—Joseph P. Gastel

[57] ABSTRACT

A pulley brace for mounting between a variable diameter driving pulley which is belt-coupled to a variable diameter driven pulley, the pulley brace consisting of an elongated body having first and second body ends and a central body portion therebetween, a first bearing connection on the first body end for coupling the elongated body to the driving pulley and a second bearing connection on the second body end for coupling the elongated body to the driven pulley and a turnbuckle arrangement at the central body portion for varying the distance between the first and second connections.

42 Claims, 2 Drawing Sheets

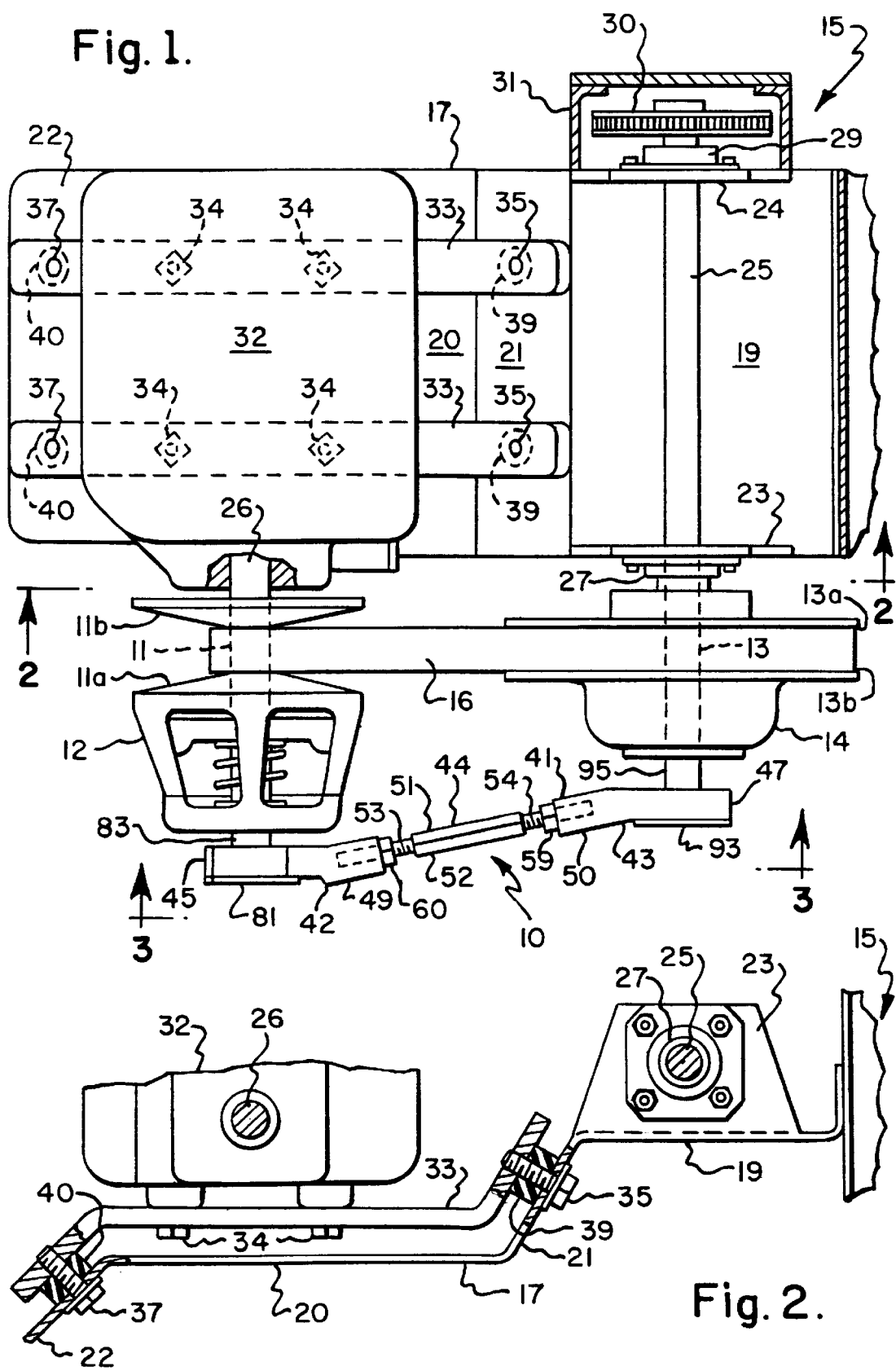

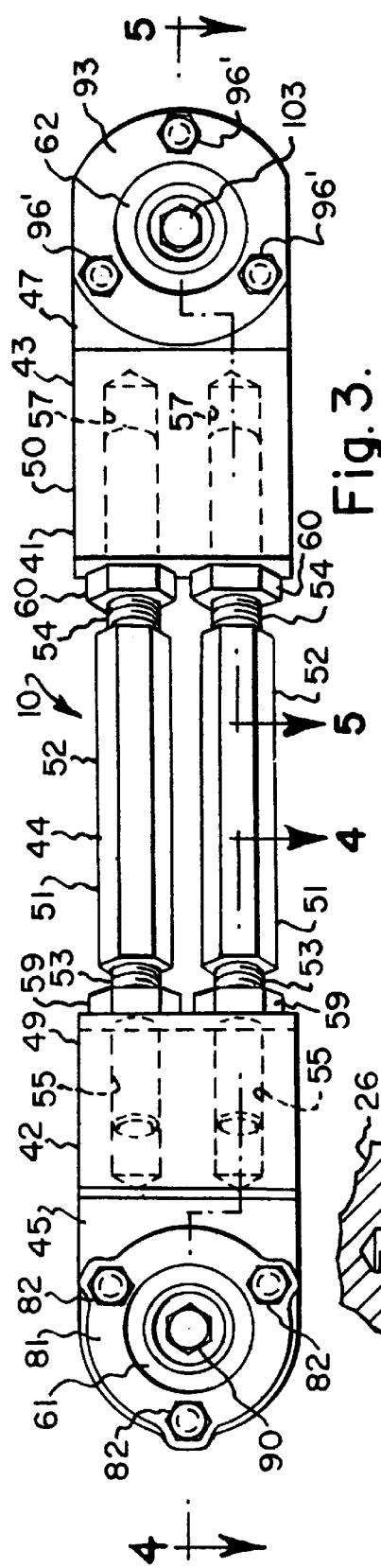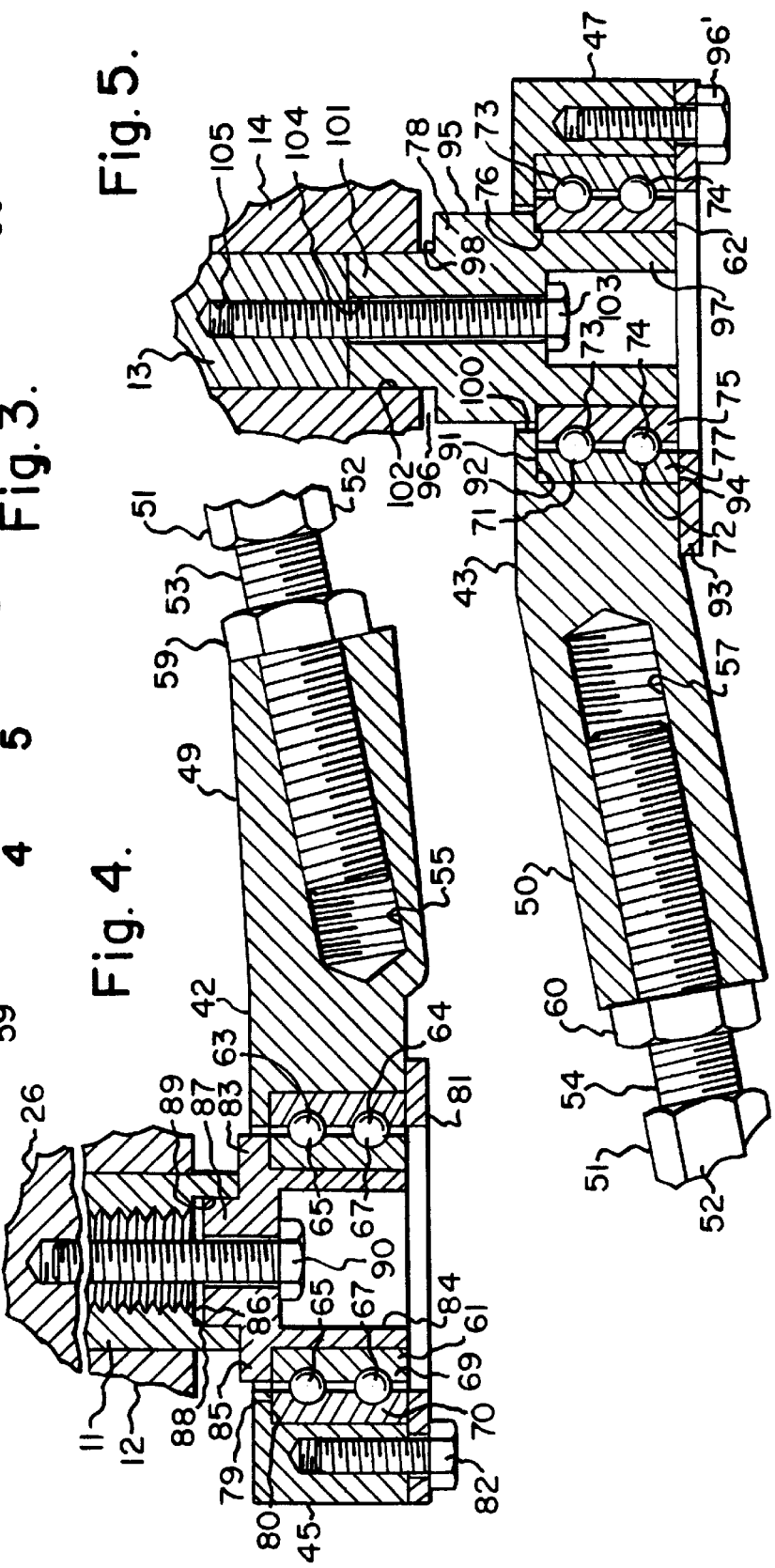

BRACE FOR OUTER ENDS OF VARIABLE PULLEY DRIVE

BACKGROUND OF THE INVENTION

The present invention relates to a pulley brace for mounting between belt-connected driving and driven variable diameter pulleys and more particularly between the driving and driven variable diameter pulleys of a snowmobile.

By way of background, in a snowmobile, a resiliently mounted engine and a driven shaft parallel thereto are both mounted on a slightly flexible sheet metal pan. The engine is connected to a speed responsive variable diameter driving pulley which is belt-coupled to a variable diameter driven pulley mounted on the driven shaft. Since the pan on which the engine and driven shaft are mounted is slightly flexible and since the engine is mounted on the pan by resilient mountings, as the engine speed is changed, the pan will flex and the resilient mounts will yield to thereby continuously change the distance between the shafts of the driver and driven pulleys which will in turn cause them to continuously change their relative diameters which will in turn result in a continuous fluctuation of snowmobile speed with attendant increased fuel consumption. The situation is further aggravated by the fact that the driven shaft will bend with abrupt increases of engine speed. It is with overcoming the foregoing deficiency of a variable pulley drive of a snowmobile that the present invention is concerned.

SUMMARY OF THE INVENTION

It is accordingly one object of the present invention to provide a pulley brace which is installable between driving and driven variable diameter pulleys for the purpose of preventing them from continuously fluctuating in diameters because of being movably mounted relative to each other to thereby cause a more positive transmission of motion therebetween.

It is another object of the present invention to provide a pulley brace mountable between the shafts of variable diameter driving and driven pulleys, with the pulley brace being adjustable so as to be mountable on shafts which have different spacings between each other.

A further object of the present invention is to provide a pulley brace in which the ends of the brace mount double bearings which tend to eliminate any cocking of the brace during operation.

A still further object of the present invention is to provide an improved pulley brace construction which is mountable on the shafts of variable diameter driving and driven pulleys in an unique manner by means of fittings which are compatible with existing pulley structures. Other objects and attendant advantages of the present invention will be more fully perceived hereafter.

The present invention relates to a pulley brace for mounting between a variable diameter driving pulley and a variable diameter driven pulley having a belt drive therebetween comprising an elongated body having first and second body ends and a central body portion therebetween, a first connection on said first body end for coupling said elongated body to said driving pulley, and a second connection on said second body end for coupling said elongated body to said driven pulley.

The present invention also relates to a pulley brace for mounting in a drive system having a pan, an engine having a driving shaft resiliently mounted on said pan, a driven shaft rotatably mounted in bearings on said pan in substantially parallel relationship to said driving shaft, a first speed responsive variable diameter pulley coupled to said driving shaft, a first pulley shaft on said first pulley, a second variable diameter pulley coupled to said driven shaft, a second pulley shaft on said second pulley, and a belt between said first and second pulleys: said pulley brace being mounted between said first and second pulleys and comprising an elongated body, a first body end on said elongated body coupled to said first pulley shaft, and a second body end on said elongated body coupled to said second pulley shaft.

The present invention will be more fully understood when the following portions of the specification are read in conjunction with the accompanying drawings wherein:

BRIEF DESCRIPTION OF THE DRAWINGS

FIG. 1 is a fragmentary plan view, partially in cross section, of a portion of a snowmobile mounting the pulley brace of the present invention between the driving and driven variable diameter pulleys;

FIG. 2 is a fragmentary cross sectional view taken substantially along line 2—2 of FIG. 1;

FIG. 3 is a side elevational view of the pulley brace of the present invention taken substantially in the direction of arrows 3—3 of FIG. 1;

FIG. 4 is an enlarged fragmentary cross sectional view taken substantially along line 4—4 of FIG. 3; and FIG. 5 is an enlarged fragmentary cross sectional view taken substantially along line 5—5 of FIG. 3.

DESCRIPTION OF THE PREFERRED EMBODIMENTS

Summarizing briefly in advance, the pulley brace 10 of the present invention performs a plurality of beneficial functions by maintaining a constant distance between pulley shaft 11 of an engine-driven speed responsive variable diameter driving pulley 12 and pulley shaft 13 of variable diameter driven pulley 14 of a snowmobile 15. In this respect by preventing pulleys shafts 11 and 13 from moving slightly toward and away from each other during operation, the continual changing of pulley diameters which normally occurs as a result of the pulley shafts moving toward and away from each other is eliminated along with a saving in fuel and a more responsive control of the speed of the snowmobile.

In FIG. 1 a fragmentary plan view of a portion of a snowmobile 15 is shown which includes a formed sheet metal pan or base 17 having horizontal portions 19 and 20 connected by inclined portion 21. A second inclined portion 22 extends downwardly from horizontal portion 20. Ears 23 and 24, which are identical, are bent up from pan portion 19. A driven shaft 25 is mounted in bearings 27 and 29 on ears 23 and 29, respectively. Driven variable diameter pulley 14 is coupled in driving relationship with one end of driven shaft 25. A gear reducer 30 is mounted on the opposite end of shaft 25 and is located within housing 31. Gear reducer 30 is suitably coupled to the drive belt (not shown) of the snowmobile.

The snowmobile engine 32 is secured to bars 33 by bolts 34. Bars 33 in turn are bolted to inclined portions 21 and 22 of pan 17 by bolts 35 and 37, respectively. Cylindrical resilient elastomeric mounts 39 and 40 encircle bolts 35 and 37, respectively, to thus resiliently mount engine 32 on pan 17. Variable diameter driving pulley 12 has a centrifugal speed responsive device associated therewith which causes pulley 12 to increase its diameter with increases in engine speed. Normally, at engine idling speed, belt 16, which couples pulleys 12 and 14, merely slips on shaft 11. However, when engine speed increases above idling, the face 11a of pulley 12 will approach face 11b to thereby increase the pulley diameter. This will exert a pull on belt 16 which in turn will cause face 13a of pulley 14 to move away from face 13b.

As noted briefly above, during engine operation, there is normally a slight movement of shafts 11 and 13 toward and away from each other because of a combination of the resilient mounting of engine 32 and the flexibility of pan 17 and the bending of driven shaft 25 which results in slight fluctuations of pulley diameters with the resultant slight fluctuations of snowmobile speed with the resultant increase of fuel consumption. All of the foregoing constitutes a prior art construction which exists in a Storm Model 1994 Polaris snowmobile which is prior art. The pulley brace 10 of the present invention overcomes the foregoing deficiency of the above-described prior art.

The pulley brace 10 of the present invention includes an elongated body 41 having body ends 42 and 43 and the central body portion 44 therebetween. Body end 42 includes an outer portion 45 and body end 43 includes an outer portion 47 which is substantially parallel to outer portion 45. Body ends 42 and 43 include inner inclined portions 49 and 50, respectively, which are in alignment and are coupled to each other by turnbuckles 51 which comprise the central body portion 44. Each turnbuckle 51 is identical and includes a bolt 52 having oppositely threaded outer ends 53 and 54 which are threadably received in tapped bores 55 and 57, respectively, in inclined end portions 49 and 50, respectively. Nuts 59 and 60 are threadably mounted on threads 53 and 54, respectively.

In order to adjust the distance between bearing 61 in body end 42 and bearing 62 in body end 43 so that they will be the exact distance apart as the shafts onto which they are to be mounted, nuts 59 and 60 of turnbuckles 51 are loosened and bolts 52 are turned in the same direction to either draw body ends 42 and 43 either closer to each other or farther away from each other as desired. Thereafter, nuts 59 and 60 are tightened to maintain the distance between bearings 61 and 62 in their desired adjusted positions. In this regard, the distance between the driven shaft 25 and the driving shaft 26 of engine 32 can vary as much as ¼ of an inch within manufacturing tolerances. It is imperative that the centers between bearings 61 and 62 be adjusted to the exact distance between the centers of shafts 25 and 26 so that they are not forced out of exact parallelism when pulley brace 10 is mounted on the outer ends of pulley shafts 11 and 13.

Bearings 61 and 62 in outer body ends 45 and 47, respectively, are double bearings for the purpose of resisting cocking between their inner races and their outer races. More specifically, bearing 61 includes circular rows 63 and 64 of bearings 65 and 67, respectively, between inner race 69 and outer race 70. Bearing 62 includes two rows 71 and 72 of bearings 73 and 74, respectively, between inner race 75 and outer race 77. The axes of rotation of bearings 61 and 62 are substantially parallel.

Bearing 61 is retained in the outer portion 45 of body end 42 in the following manner. The annular end 79 of outer race 70 bears against shoulder 80 of body portion 45. A retaining ring 81 is secured to outer body end portion 45 by a plurality of bolts 82 and ring 81 bears against outer race 70. A fitting 83 has a cylindrical hollow inner portion 84 press-fitted into inner race 69, and it has an annular shoulder 85 which bears against inner race 69, and it has a cylindrical end portion 87 which is received in cylindrical bore 89 of pulley shaft 11. A bolt 90 secures fitting 83 to engine shaft 26 after passing through hollow pulley shaft 11. A space 86 exists between the end of end portion 87 and shoulder 88 within pulley shaft 11.

Bearing 62 is secured in body end 43 in the following manner. The annular end 91 of outer race 77 bears against shoulder 92 of body end 43. A ring 93 bears against end 94 of outer race 77 and is secured to outer body end 47 by a plurality of bolts 96'. A fitting 95 has a hollow annular portion 97 which is press-fitted into inner race 75 and an annular shoulder 76 of enlarged central portion 78 of fitting 95 bears against inner race 75. Central portion 78 of fitting 95 extends through opening 100 in body end 43. A cylindrical end 101 of fitting 95 is received in cylindrical bore 102 of pulley shaft 13, and the end of cylindrical end 101 bears against pulley shaft 13. A bolt 103 extends through a bore 104 in fitting 95 and is threadably received in bore 105 of pulley shaft 13. A space 96 is maintained between fitting shoulder 98 and pulley 14.

In order to mount the pulley brace 10 onto pulley shafts 11 and 13, existing fittings (not shown) on the pulleys 12 and 14 are removed and are replaced by mounting fittings 83 and 95 on the outer ends of driving pulley shaft 11 and driven pulley shaft 13, respectively. The removed fittings are identical to portions of fittings 83 and 95, but the latter have additional structure for mounting pulley brace 10.

As noted above, the pulley brace 10 of the present invention is manifestly capable of achieving the above objects because it rigidizes pan 17 against flexing while permitting engine 32 to remain slightly resiliently mounted on mounts 39 and 40 thus preventing pulley shafts 11 and 13 from moving toward and away from each other provides smoother operation of the snowmobile and conserves fuel.

While a specific pulley brace 10 has been disclosed which is for mounting on a specific snowmobile, namely, a 1994 Polaris Storm model, it will be appreciated that the pulley brace of the present invention can be used on different snowmobile models by the use of differently shaped fittings which have portions received in the bearings of the pulley brace and other portions which can be connected to the shafts of the variable diameter pulleys, or in any other suitable manner wherein the pulley brace can be effectively connected to maintain the pulley shafts at a constant distance from each other, and thus while a preferred embodiment of the pulley brace has been disclosed, it will be appreciated that it is not limited thereto but may be otherwise embodied within the scope of the following claims.

What is claimed is:

1. In a drive system having a pan, an engine having a driving shaft, said engine being resiliently mounted on said pan, a driven shaft rotatably mounted in bearings on said pan in substantially parallel relationship to said driving shaft, a first speed responsive variable diameter pulley coupled to said driving shaft, a first pulley shaft on said first pulley, a first outer end on said first pulley shaft, a second variable diameter pulley coupled to said driven shaft, a second pulley shaft on said second pulley, a second outer end on said second pulley shaft, and a belt between said first and second pulleys: wherein the improvement comprises a pulley brace mounted solely between said first and second outer ends of said first and second pulley shafts, respectively, said pulley brace comprising an elongated body, a first body end on said elongated body coupled solely to said first outer end of said first pulley shaft, and a second body end on said elongated body coupled solely to said second outer end of said second pulley shaft.

2. In a drive system as set forth in claim 1 wherein said first body end includes a bearing between said first body end and said first outer end of said first pulley shaft.

3. In a drive system as set forth in claim 2 wherein said bearing comprises a double bearing.

4. In a drive system as set forth in claim 2 wherein said second body end includes a second bearing between said second body end and said second outer end of said second pulley shaft.

5. In a drive system as set forth in claim 4 wherein said bearing comprises a double bearing.

6. In a drive system as set forth in claim 5 wherein said second bearing comprises a second double bearing.

7. In a drive system as set forth in claim 2 wherein said bearing includes an inner race and an outer race, and wherein said outer race is mounted on said first body end, and said inner race is affixed to said first outer end of said first pulley shaft.

8. In a drive system as set forth in claim 7 wherein said second bearing includes a second inner race and a second outer race, and wherein said second outer race is mounted on said second body end, and said second inner race is affixed to said second outer end of said second pulley shaft.

9. In a drive system as set forth in claim 1 including an adjustable central body portion on said elongated body between said first and second body ends.

10. In a drive system as set forth in claim 9 wherein said first body end includes a bearing between said first body end and said first outer end of said first pulley shaft.

11. In a drive system as set forth in claim 10 wherein said bearing comprises a double bearing.

12. In a drive system as set forth in claim 10 wherein said second body end includes a second bearing between said second body end and said second outer end of said second pulley shaft.

13. In a drive system as set forth in claim 12 wherein said bearing comprises a double bearing.

14. In a drive system as set forth in claim 13 wherein said second bearing comprises a second double bearing.

15. In a drive system as set forth in claim 10 wherein said bearing includes an inner race and an outer race, and wherein said outer race is mounted on said first body end, and said first inner race is affixed to said first outer end of said first pulley shaft.

16. In a drive system as set forth in claim 15 wherein said second bearing includes a second inner race and a second outer race, and wherein said second outer race is mounted on said second body end, and said second inner race is affixed to said second outer end of said second pulley shaft.

17. In a drive system as set forth in claim 9 wherein said adjustable central body portion comprises at least one turnbuckle.

18. In a drive system as set forth in claim 17 wherein said first body end includes a bearing between said first body end and said first outer end of said first pulley shaft.

19. In a drive system as set forth in claim 18 wherein said bearing comprises a double bearing.

20. In a drive system as set forth in claim 18 wherein said second body end includes a second bearing between said second body end and said second outer end of said second pulley shaft.

21. In a drive system as set forth in claim 20 wherein said bearing comprises a double bearing.

22. In a drive system as set forth in claim 21 wherein said second bearing comprises a second double bearing.

23. In a drive system as set forth in claim 18 wherein said bearing includes an inner race and an outer race, and wherein said outer race is mounted on said first body end, and said first inner race is affixed to said first outer end of said first pulley shaft.

24. In a drive system as set forth in claim 23 wherein said second bearing includes a second inner race and a second outer race, and wherein said second outer race is mounted on said second body end, and said second inner race is affixed to said second pulley shaft.

25. A pulley brace for mounting solely between the outer end of the shaft of a variable diameter driving pulley and the outer end of the shaft of a variable diameter driven pulley having a belt drive therebetween comprising an elongated body having first and second body ends and a central body portion therebetween, a first connection on said first body end for coupling said elongated body solely to the outer end of a driving pulley shaft, and a second connection on said second body end for coupling said elongated body solely to the outer end of a driven pulley shaft.

26. A pulley brace as set forth in claim 25 wherein said first connection includes a bearing.

27. A pulley brace as set forth in claim 25 wherein said second connection includes a bearing.

28. A pulley brace as set forth in claim 27 wherein said first connection includes a second bearing.

29. A pulley brace as set forth in claim 28 wherein at least one of said bearing and said second bearing is a double bearing.

30. A pulley brace as set forth in claim 25 wherein said first and second body ends include first and second end portions, respectively, which are offset from said central body portion and are substantially parallel to each other.

31. A pulley brace as set forth in claim 30 wherein said first connection includes a bearing.

32. A pulley brace as set forth in claim 30 wherein said second connection includes a bearing.

33. A pulley brace as set forth in claim 32 wherein said first connection includes a second bearing.

34. A pulley brace as set forth in claim 33 wherein said bearing and said second bearing have axes which are substantially parallel.

35. A pulley brace as set forth in claim 30 wherein said first and second end portions include third and fourth end portions, respectively, which are in substantial alignment with said central body portion.

36. A pulley brace as set forth in claim 35 including an adjustable connection between said central body portion and said third and fourth end portions.

37. A pulley brace as set forth in claim 36 wherein said adjustable connection comprises at least one turnbuckle.

38. A pulley brace as set forth in claim 36 wherein said adjustable connection comprises a pair of turnbuckles.

39. A pulley brace as set forth in claim 25 wherein said first connection includes a first bearing and wherein said second connection includes a second bearing, said first and second bearings having axes which are substantially parallel.

40. A pulley brace as set forth in claim 25 wherein said first connection includes a first bearing and a first fitting coupled between said first bearing and said driving pulley shaft, and wherein said second connection comprises a second bearing and a second fitting coupled between said second bearing and said driven pulley shaft.

41. A pulley brace for mounting solely between the outer end of a variable diameter driving pulley and the outer end of a variable diameter driven pulley having a belt drive therebetween comprising an elongated body having first and second body ends and a central body portion therebetween, first connection means on said first body end for coupling said first body end to the outer end of a driving pulley for maintaining a driving pulley a fixed distance from a driven pulley, and second connection means on said second body end for coupling said second body end to the outer end of a driven pulley for maintaining a driven pulley a fixed distance from a driving pulley.

42. In a drive system having a pan, an engine having a driving shaft, said engine being resiliently mounted on said pan, a driven shaft rotatably mounted in bearings on said pan in substantially parallel relationship to said driving shaft, a first speed responsive variable diameter pulley coupled to said driving shaft, a first pulley shaft on said first pulley, a first outer end on said first pulley shaft, a second variable diameter pulley coupled to said driven shaft, a second pulley shaft on said second pulley, a second outer end on said second pulley shaft, and a belt between said first and second pulleys: wherein the improvement comprises a pulley brace mounted solely between said first and second outer ends of said first and second pulley shafts, respectively, said pulley brace comprising an elongated body, a first body end on said elongaed body, first means on said first body end coupled to said first outer end of said first pulley shaft for maintaining said first pulley shaft a fixed distance from said second pulley shaft, a second body end on said elongated body, and second means on said second body end coupled to said second outer end of said second pulley shaft for maintaining said second pulley shaft a fixed distance from said first pulley shaft.

* * * * *

UNITED STATES PATENT AND TRADEMARK OFFICE
CERTIFICATE OF CORRECTION

PATENT NO.   : 5,836,843
DATED        : November 17, 1998
INVENTOR(S)  : Dennis P. Richards It is certified that error appears in the above-identified patent and that said Letters Patent is hereby corrected as shown below:

Column 6, line 8 (claim 24), after "said" insert
          --second outer end of said--.

Signed and Sealed this

Second Day of March, 1999

Attest:

Q. TODD DICKINSON

*Attesting Officer*         *Acting Commissioner of Patents and Trademarks*